(12) United States Patent
Toumpakaris et al.

(10) Patent No.: US 7,778,336 B1
(45) Date of Patent: *Aug. 17, 2010

(54) TIMING AND FREQUENCY SYNCHRONIZATION OF OFDM SIGNALS FOR CHANGING CHANNEL CONDITIONS

(75) Inventors: Dimitrios-Alexandros Toumpakaris, Sunnyvale, CA (US); Jungwon Lee, Cupertino, CA (US); Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 884 days.

This patent is subject to a terminal disclaimer.

(21) Appl. No.: 11/199,840

(22) Filed: Aug. 9, 2005

Related U.S. Application Data

(60) Provisional application No. 60/651,871, filed on Feb. 9, 2005.

(51) Int. Cl.
H04K 1/10 (2006.01)

(52) U.S. Cl. .................. 375/260; 375/354; 375/357; 375/359; 375/368; 375/346; 375/262; 375/355; 375/362; 375/372

(58) Field of Classification Search ............... 375/354, 375/357, 359, 368, 316
See application file for complete search history.

(56) References Cited

U.S. PATENT DOCUMENTS

| | | | |
|---|---|---|---|
| 6,646,980 B1 * | 11/2003 | Yamamoto et al. | 370/208 |
| 6,771,591 B1 * | 8/2004 | Belotserkovsky et al. | 370/210 |
| 6,882,619 B1 * | 4/2005 | Gerakoulis | 370/209 |
| 6,891,792 B1 * | 5/2005 | Cimini et al. | 370/206 |
| 6,922,388 B1 | 7/2005 | Laroia et al. | |
| 6,993,083 B1 * | 1/2006 | Shirakata et al. | 375/260 |
| 7,012,881 B2 * | 3/2006 | Kim | 370/208 |
| 7,139,320 B1 * | 11/2006 | Singh et al. | 375/260 |
| 7,227,834 B1 * | 6/2007 | Barton et al. | 370/208 |
| 7,418,040 B2 * | 8/2008 | Rudowicz et al. | 375/260 |
| 7,423,959 B2 | 9/2008 | Martin et al. | |
| 2002/0041637 A1 * | 4/2002 | Smart et al. | 375/316 |
| 2002/0126618 A1 * | 9/2002 | Kim | 370/208 |
| 2002/0137464 A1 * | 9/2002 | Dolgonos et al. | 455/60 |
| 2003/0016773 A1 * | 1/2003 | Atungsiri et al. | 375/355 |
| 2003/0026360 A1 * | 2/2003 | Ramasubramanian et al. | 375/343 |
| 2003/0231714 A1 * | 12/2003 | Kjeldsen et al. | 375/259 |

(Continued)

FOREIGN PATENT DOCUMENTS

EP 1276289 A2 * 1/2003

OTHER PUBLICATIONS

So, Sang, Hyun, "Guard section length detecting deviec and mehod for orthogonal frequency division multiplexing system receiver", Apr. 8, 1999, WO 99/17492.*

(Continued)

*Primary Examiner*—Chieh M Fan
*Assistant Examiner*—Siu M Lee

(57) ABSTRACT

An Orthogonal Frequency Division Multiplexing (OFDM) synchronization module includes a window generator module, a symbol timing estimator module, and a reliability metric calculator. The window generator module generates a sampling window that bounds a plurality of samples of OFDM symbols. The symbol timing estimator module generates an estimated symbol timing from the plurality of samples before a fast Fourier transform operation is performed on the plurality of samples. The reliability metric calculator calculates a reliability metric for the estimated symbol timing based on the estimated symbol timing. The window generator module changes at least one parameter of the sampling window based on the reliability metric.

57 Claims, 7 Drawing Sheets

U.S. PATENT DOCUMENTS

| | | | |
|---|---|---|---|
| 2004/0105512 A1* | 6/2004 | Priotti | 375/340 |
| 2004/0179633 A1* | 9/2004 | Shinoda et al. | 375/343 |
| 2004/0184551 A1 | 9/2004 | Liu et al. | |
| 2004/0190638 A1 | 9/2004 | Claret et al. | |
| 2004/0247044 A1* | 12/2004 | Matsushita et al. | 375/316 |
| 2005/0251844 A1 | 11/2005 | Martone et al. | |
| 2006/0018413 A1* | 1/2006 | Gupta | 375/343 |

OTHER PUBLICATIONS

A.M. Gallardo and J. Rodriguez Tellez, Comaprison of joint coarse timing and fine carrier frquency estimation algorithm for a DVB-T OFDM based single frequency networks, IEEE 0/7803-7484-3/02/ 2002.*

Arto Palin and Jukka Rinne, "Enhanced symbol synchronziation method for OFDM system in SFN channels", dated 1998, IEEE 0/7803-7984-9/98.*

Jan-Jaap van de Beek, Magnus Sandell and Per Ola Borjesson, "ML estimation of time and frequency offset in OFDm systems", dated Jul. 1997, IEEE transaction on signal processing, vol. 46, No. 7, pp. 1800-1805.*

Jan-Jaap van de Beek et al., "ML Estimation of Time and Frequency Offset in OFDM Systems", IEEE Transactions on Signal Processing, vol. 45, No. 7, Jul. 1997.

Schmidl, Timothy M. et al., "Robust Frequency and Timing Synchronization for OFDM, IEEE Transactions on Communications", vol. 45, No. 12, Dec. 1997.

Muller-Weinfurtner, Stefan H., "On the Optimality of Metrics for Coarse Frame Synchronization in OFDM: A Comparison", Laboratorium fur Nachrichtentechnik, 1998.

Lee, J. et al., "Maximum Likelihood Estimation of Time and Frequency Offset for OFDM Systems", Electronics Letters, vol. 40, No. 22, Oct. 2004.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/ MAN Standards Committee of the IEEE Computer Society; 69 pages.

802.11 n; IEEE P802.11-04/0889r6; Wireless LANs, TGn Sync Proposal Technical Specification; 131 pages.

Pollet, et al., "BER Sensitivity of OFDM Systems to Carrier Frequency Offset and Wiener Phase Noise," IEEE Transactions on Communications, vol. 43, No. 2/3/4, Feb./Mar./Apr. 1995, pp. 191-193.

Zou et al., "COFDM: An Overview," IEEE Transactions on Broadcasting, vol. 41, No. 1, Mar. 1995, pp. 1-8.

* cited by examiner

TIMING AND FREQUENCY SYNCHRONIZATION OF OFDM SIGNALS FOR CHANGING CHANNEL CONDITIONS

CROSS-REFERENCE TO RELATED APPLICATIONS

This application claims the benefit of U.S. Provisional Application No. 60/651,871, filed on Feb. 9, 2005. The disclosure of the above application is incorporated herein by reference.

FIELD OF THE INVENTION

The present invention relates to methods for synchronizing an orthogonal frequency domain multiplexed (OFDM) receiver with an OFDM signal.

BACKGROUND OF THE INVENTION

Synchronizing a receiver with a received signal can be achieved by estimating symbol timing, carrier frequency offset, carrier phase offset, and/or sampling rate offset. Synchronization can be performed when the receiver begins operating and can continue while the receiver is operating. This continuing synchronization is sometimes referred to as tracking. Tracking can enhance the performance of a communications system.

One synchronization method estimates the symbol timing and the carrier frequency offset of OFDM symbols using redundancy in a cyclic prefix of the OFDM symbols. The method includes a joint Maximum Likelihood (ML) estimator of the symbol timing and the carrier frequency offset for an additive white Gaussian noise (AWGN) channel. The joint ML estimator employs a plurality of samples in an observation window. Performance of the joint ML estimator can depend on channel conditions. When the joint ML estimator is applied to a communication system with changing channel conditions, its performance can be less than desirable. Also, the joint ML estimator assumes a signal-to-noise ratio (SNR). In practice however, the SNR is not readily available.

In another synchronization approach, reliability of the symbol timing estimate and the carrier frequency offset estimate is estimated. However, this approach requires that some OFDM symbols in the received signal contain training sequences that are known by the receiver. If the symbol timing and the carrier frequency offset estimates are not reliable, this approach needs to wait for an OFDM symbol that includes the training sequences.

Data received during one training sequence usually cannot be used with data from subsequent training sequences because the symbol timing and the carrier frequency offset typically change from one training sequence to another. Therefore, the data associated with a current training sequence is discarded if it is determined that the reliability of the training sequence was less than desirable.

Synchronization delay in the second approach can also become undesirably long if the training sequences are received when the channel is in a fading condition. Finally, a receiver using the second approach cannot synchronize if the transmitter does not insert the training sequences into at least some of the OFDM symbols.

SUMMARY OF THE INVENTION

An Orthogonal Frequency Division Multiplexing (OFDM) synchronization module is provided that synchronizes with a stream of OFDM symbol samples. The synchronization module includes a window generator module that generates a sampling window that bounds a plurality of the symbol samples. A symbol timing estimator module estimates symbol timing from the plurality of the symbol samples. A reliability metric calculator calculates a reliability metric based on the plurality of the symbol samples. The window generator module changes at least one parameter of the sampling window based on the reliability metric.

In other features, the symbol samples include cyclic prefixes and/or data samples. The window generator module can change the at least one parameter of the sampling window based on the reliability metric and a reliability threshold. The at least one parameter can include a first width of the sampling window and/or a starting position of the sampling window. The first width of the sampling window can be an integer multiple of a second width of the plurality of samples.

In other features, the synchronization module includes a fractional carrier frequency offset determination module that determines a fractional carrier frequency offset when the reliability metric exceeds a reliability threshold. The window generator module can change the at least one parameter of the sampling window until the reliability metric exceeds the reliability threshold.

In other features, the symbol timing estimator module can apply corresponding weighting factors to groups of the plurality of samples. Each corresponding weighting factor can be based on a quality of the corresponding group of samples. Each corresponding weighting factor can be based on a signal-to-noise (SNR) ratio of the corresponding group of samples.

In other features, a receiver includes the OFDM synchronization module. The receiver can be compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

In other features, the receiver includes an RF demodulator that receives streaming symbol frames and generates the stream of OFDM symbol samples based on the streaming symbol frames. A cyclic prefix removal module communicates with the RF demodulator and removes cyclic, prefix samples from the plurality of samples. A serial-to-parallel (S2P) module communicates with the cyclic prefix removal module and generates time-domain parallel signals based on data samples in the stream of samples. A fast-Fourier transfer module receives the time-domain parallel signals and converts them to corresponding parallel signal streams. A signal mapping module receives the parallel signal streams and maps them to a parallel-to serial (P2S) module. The P2S module generates digital data packets based on the parallel signal streams.

A method is provided for synchronizing with a stream of Orthogonal Frequency Division Multiplexing (OFDM) symbol samples. The method includes generating a sampling window that bounds a plurality of the samples, estimating a symbol timing from the plurality of samples, and calculating a reliability metric based on the plurality of samples. The method changes at least one parameter of the sampling window based on the reliability metric.

In other features, the samples include cyclic prefix samples and/or data samples. The method can include changing the at least one parameter of the sampling window based on the reliability metric and a reliability threshold. The at least one parameter can include a first width of the sampling window. The at least one parameter can include a starting position of the sampling window. The first width of the sampling window can be an integer multiple of a second width of the plurality of samples.

In other features, the method determines a fractional carrier frequency offset when the reliability metric exceeds a reliability threshold. The method can also include changing the at least one parameter of the sampling window until the reliability metric exceeds the reliability threshold.

In other features, the method includes applying corresponding weighting factors to groups of the plurality of samples. Each corresponding weighting factor can be based on a quality of the corresponding group of samples. Each corresponding weighting factor can be based on a signal-to-noise (SNR) ratio of the corresponding group of samples.

In other features, the method is compliant with at least one of IEEE 802.11a, IEEE 802.11g, IEEE 802.11n, ETSI DVB-H, ETSI DVB-T, ETSI EN 300 401 V1.3.3, ETSI ES 201 980 V2.1.1, and NRSC-5. The method can include receiving streaming symbol frames, generating the stream of OFDM symbol samples based on the streaming symbol frames, removing cyclic prefix samples from the symbol samples, generating time-domain parallel signals based on data samples in the stream of samples, converting the time-domain parallel signals to corresponding parallel signal streams, and generating digital data packets based on the parallel signal streams.

An Orthogonal Frequency Division Multiplexing (OFDM) synchronization module is provided that synchronizes with a stream of OFDM symbol samples. The synchronization module includes window generating means for generating a sampling window that bounds a plurality of the samples, symbol timing estimating means for estimating a symbol timing from the plurality of samples, and reliability metric calculating means for calculating a reliability metric based on the plurality of samples. The window generating means changes at least one parameter of the sampling window based on the reliability metric.

In other features, the samples include cyclic prefix samples and/or data samples. The window generating means can change the at least one parameter of the sampling window based on the reliability metric and a reliability threshold. The at least one parameter can include a first width of the sampling window. The at least one parameter can include a starting position of the sampling window. The first width of the sampling window can be an integer multiple of a second width of the plurality of samples.

In other features, the synchronization module further includes fractional carrier frequency offset determining means for determining a fractional carrier frequency offset when the reliability metric exceeds a reliability threshold. The window generating means can change the at least one parameter of the sampling window until the reliability metric exceeds the reliability threshold. The symbol timing estimating means can apply corresponding weighting factors to groups of the plurality of samples. Each corresponding weighting factor can be based on a quality of the corresponding group of samples. Each corresponding weighting factor can be based on a signal-to-noise (SNR) ratio of the corresponding group of samples.

In other features, a receiver includes the OFDM synchronization module. The receiver can be compliant with at least one of IEEE 802.11a, IEEE 802.11g, IEEE 802.11n, ETSI DVB-H, ETSI DVB-T, ETSI EN 300 401 V1.3.3, ETSI ES 201 980 V2.1.1, and NRSC-5

In other features, the receiver includes RF demodulating means for receiving streaming symbol frames and generating the stream of OFDM symbol samples based on the streaming symbol frames, and cyclic prefix removal means for communicating with the RF demodulator and removing cyclic prefix samples from the plurality of samples. The receiver also includes serial-to-parallel (S2P) means for communicating with the cyclic prefix removal means and generating time-domain parallel signals based on data samples in the stream of samples, fast-Fourier means for receiving the time-domain parallel signals and converting them to corresponding parallel signal streams, and signal mapping means for receiving the parallel signal streams and mapping them to parallel-to serial (P2S) means for generating digital data packets based on the parallel signal streams.

A software method is provided for synchronizing with a stream of Orthogonal Frequency Division Multiplexing (OFDM) samples. The software method includes generating a sampling window that bounds a plurality of the samples, estimating a symbol timing from the plurality of samples, and calculating a reliability metric based on the plurality of amples. The software method changes at least one parameter of the sampling window based on the reliability metric.

In other features, the samples include cyclic prefix samples and/or data samples. The software method can include changing the at least one parameter of the sampling window based on the reliability metric and a reliability threshold. The at least one parameter can include a first width of the sampling window. The at least one parameter can include a starting position of the sampling window. The first width of the sampling window can be an integer multiple of a second width of the plurality of samples.

In other features, the software method determines a fractional carrier frequency offset when the reliability metric exceeds a reliability threshold. The software method can also include changing the at least one parameter of the sampling window until the reliability metric exceeds the reliability threshold.

In other features, the software method includes applying corresponding weighting factors to groups of the plurality of samples. Each corresponding weighting factor can be based on a quality of the corresponding group of samples. Each corresponding weighting factor can be based on a signal-to-noise (SNR) ratio of the corresponding group of samples.

In other features, the software method is compliant with at least one of IEEE 802.11a, IEEE 802.11g, IEEE 802.11n, ETSI DVB-H, ETSI DVB-T, ETSI EN 300 401 V1.3.3, ETSI ES 201 980 V2.1.1, and NRSC-5. The software method can include receiving streaming symbol frames, generating the stream of OFDM symbol samples based on the streaming symbol frames, removing cyclic prefix samples from the symbol samples, generating time-domain parallel signals based on data samples in the stream of samples, converting the time-domain parallel signals to corresponding parallel signal streams, and generating digital data packets based on the parallel signal streams.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
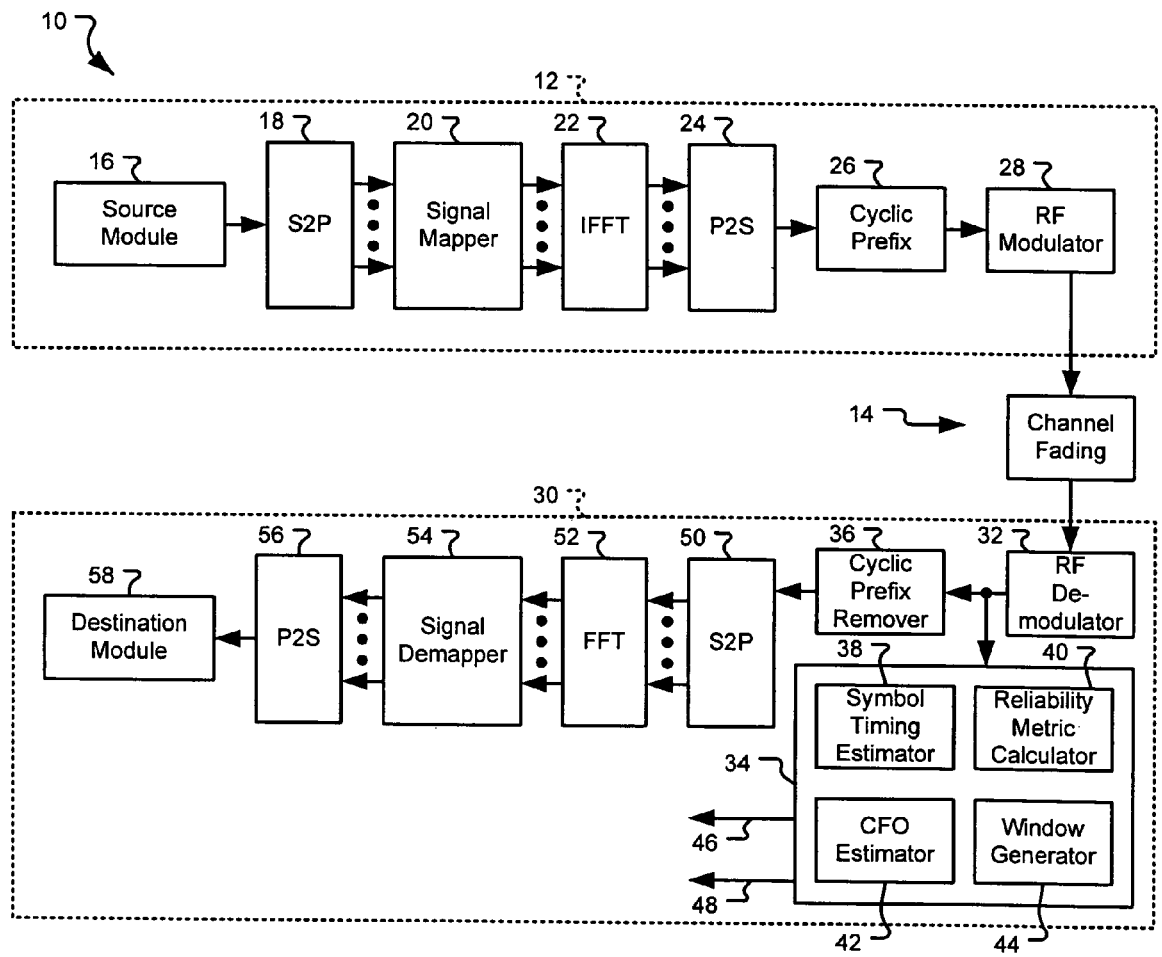
FIG. 1 is a functional block diagram of an OFDM communication system.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements.

Referring now to FIG. 1, a functional block diagram is shown of an OFDM communications system 10. The system 10 includes a transmitter 12 that transmits a stream of OFDM symbol frames through a wireless channel 14. The OFDM symbol frames carry digital data packets generated by a source module 16. The communications system 10 can be implemented to be compatible with various digital broadcasting standards. Examples of these standards include the European Telecommunications Standard Institute (ETSI) Digital Video Broadcasting (DVB), Digital Audio Broadcasting (DAB), and Digital Radio Mondiale (DRM) standards, which are hereby incorporated by reference in their entirety. Another standard is the National Radio Systems Committee (NRSC) In-band/On-channel Digital Radio Broadcasting Standard, NRSC-5, which is hereby incorporated by reference in its entirety.

An output of the source module 16 connects to an input of a serial-to-parallel (S2P) converter module 18. The S2P converter module 18 converts the incoming digital data packets to a plurality of parallel signal streams. A signal mapping module 20 receives the parallel signal streams and maps them to a plurality of OFDM sub-channels that are connected to its outputs. An inverse fast-Fourier transform module 22 receives the parallel signal streams from the mapping module 20 and converts each of them from a frequency-domain signal to a corresponding time-domain signal.

Figure 2:
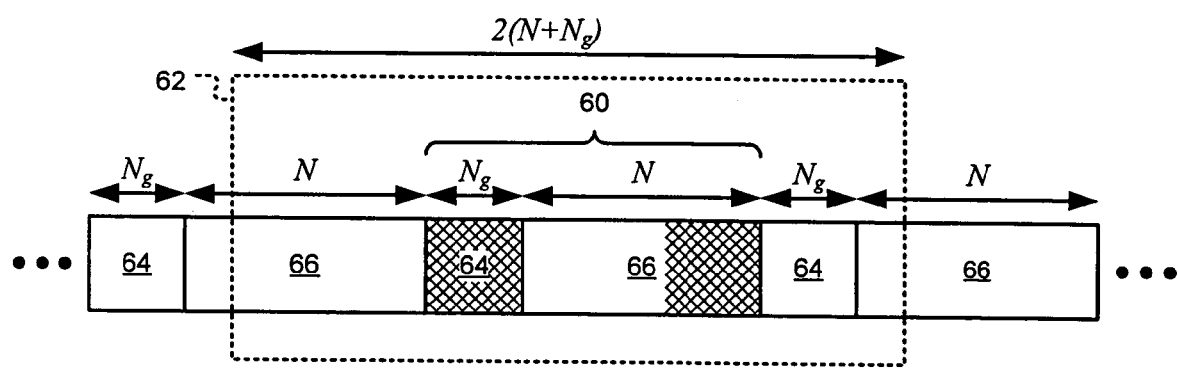
FIG. 2 is a timing diagram of an OFDM symbol stream and a sampling window.

A parallel-to-serial (P2S) converter module 24 receives the time-domain parallel signals and converts them to a serial stream of data symbols. A cyclic prefix module 26 forms symbol frames by prepending a cyclic prefix to each of the data symbols (FIG. 2). The cyclic prefix module 26 streams the symbol frames to an RF modulator 28. The RF modulator 28 includes a transmit antenna that transmits the streaming symbol frames through the wireless channel 14.

A receiver 30 includes an RF demodulator 32 that receives and demodulates the streaming symbol frames. A synchronization module 34 and a cyclic prefix removal module 36 receive the demodulated streaming symbol frames from the RF demodulator 32. The synchronization module 34 observes the demodulated streaming symbol frames and executes methods that are described later. The synchronization module 34 includes a symbol timing estimator module 38, a reliability metric calculation module 40, a fractional carrier frequency offset (CFO) estimator module 42, and a window generator module 44. The synchronization module 34 also generates a symbol timing signal 46 and a fractional CFO signal 48.

The cyclic prefix removal module 36 removes the cyclic prefix and communicates the serial stream of data symbols to a S2P module 50. The S2P module 50 divides the serial stream of data symbols back into time-domain parallel signals. A fast-Fourier transfer module 52 receives the time-domain parallel signals and converts them back to corresponding parallel signal streams.

A signal demapping module 54 receives the parallel signal streams and demaps them to a P2S module 56. The P2S module 56 converts the parallel signal streams into digital data packets. A destination module 58 receives the digital data packets and extracts the digital data from them.

Figure 1A:
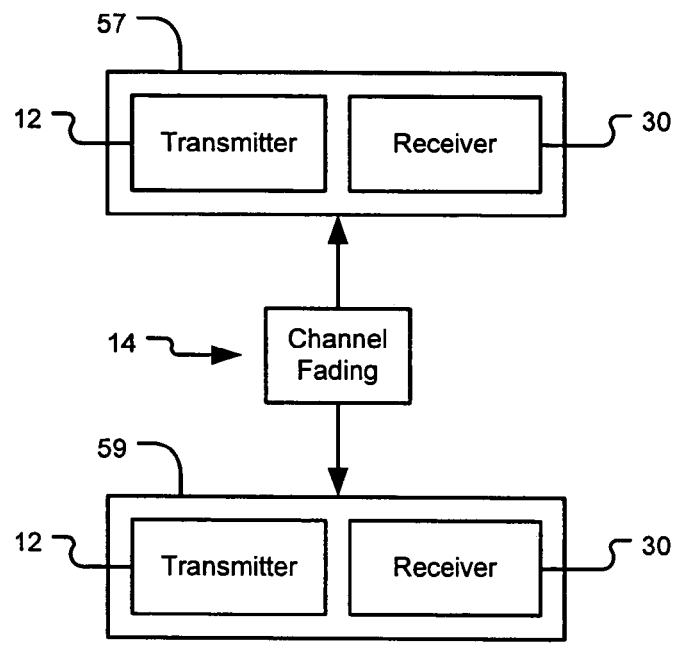
FIG. 1A is a functional block diagram of transceivers that include the communication system of FIG. 1.

Referring now to FIG. 1A, a functional block diagram is shown of a first wireless transceiver 57 in bi-directional communication with a second wireless transceiver 59. Bi-directional communication is achieved by providing each wireless transceiver 57, 59 with a corresponding transmitter 12 and receiver 30. The wireless transceivers 57, 59 communicate through the wireless channel 14. The wireless transceivers 57, 59 can be implemented to be compatible with the IEEE 802.11 standard as amended, which is hereby incorporated by reference in its entirety. The 802.11a, 802.11g, and 802.11n amendments are related to OFDM and the wireless transceivers 57, 59 can also be implemented to be compatible with those amendments.

Referring now to FIG. 2, a timing diagram is shown of the demodulated streaming symbol frames 60 and a sampling window 62. The symbol frames 60 each include two parts. The first group includes N data samples 66 and the second group includes $N_g$ cyclic prefix samples 64, where N and $N_g$ are integers. The cyclic prefix samples 64 are copied from the last IFFT samples of an associated group of data samples 66. In one of the symbol frames 60, the last IFFT samples and the associated cyclic prefix samples 64 are shown cross-hatched. A duration of the group of cyclic prefix samples 64 is preferably greater than a predetermined difference in multi-path propagation arrival times at the RF demodulator 32.

The synchronization module 34 observes the streaming symbol frames 60 for a duration of the sampling window 62. The window generator module 44 determines the duration and position of the sampling window 62.

The depicted sampling window 62 includes $W=2N_t=2(N+N_g)$ consecutive samples, where N is a number of OFDM subcarriers in the data samples 66, $N_g$ is the number of cyclic prefix samples 64, and $N_t$ is a total number of samples of the OFDM streaming symbol frame 60. Since the synchronization module 34 does not initially know a position of the first sample of the data part 66, the sampling window 62 will generally include samples from three consecutive groups of samples 64, 66.

Figure 3:
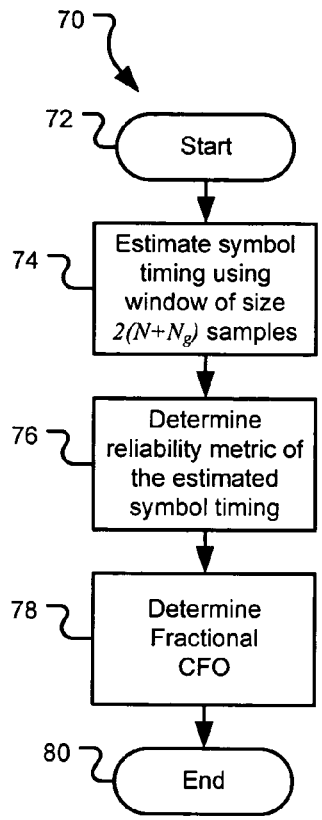
FIG. 3 is a flow chart illustrating steps of a method for estimating symbol timing and a reliability metric from an OFDM symbol stream.

Referring now to FIG. 3, a flow chart is shown of a method 70 for estimating symbol timing and determining a reliability metric from the streaming symbol frames 60. Prior to describing the method 70, fading properties of the wireless channel 14 can be modeled as follows:

Let r(k) denote the received samples inside the sampling window 62, where $k=0, \ldots 2(N+N_g)-1$, and $$r(k)=(h*x)(k)+n(k),$$

where * denotes the convolution operation, x(k) are the transmitted samples; and h is a vector of channel taps. Samples n(k) are zero-mean complex-Gaussian noise samples with variance $\sigma^2_n$. For an additive white Gaussian noise (AWGN) wireless channel 14, $r(k)=x(k)+n(k)$ (h=1), whereas for a flat-fading wireless channel 14, $r(k)=h_k x(k)+n(k)(h=h_k)$.

The method 70 begins at a start block 72. Control then proceeds to block 74 and estimates symbol timing of the streaming symbol frames 60. Block 74 uses a sampling window 62 of $2(N+N_g)$ samples. By way of non-limiting example, the symbol timing estimator module 38 can execute block 74 by solving an equation such as $$\hat{\theta} = \arg\max_{\theta}\{|\gamma(\theta)|\}, \text{ or}$$

$$\hat{\theta} = \arg\max_{\theta}\{|\gamma(\theta)| - \Phi(\theta)\}, \text{ where}$$

$$\gamma(\theta) \triangleq \sum_{k=\theta}^{\theta+N_g-1} r(k)r*(k+N), \text{ and}$$

$$\Phi(\theta) \cong \frac{1}{2}\sum_{k=\theta}^{\theta+N_g-1}\{|r(k)|^2+|r(k+N)|^2\}, \text{ for } \theta=0,\ldots,N_t-1,$$

where $N_t$ denotes the total number of samples of the OFDM streaming symbol frame 60, and $y(\theta)$ and $\phi(\theta)$ denote autocorrelation and normalized energy values of the received samples inside the sampling window 62, respectively. See, for example, S. H. Müller-Weinfurtner, "*On the optimality of metrics for coarse frame synchronization in OFDM: a comparison*," The Ninth IEEE International Symposium on Personal, Indoor and Mobile Radio Communications, vol. 2, pp. 533-537, September 1998, which is hereby incorporated by reference in its entirety.

After finding $\hat{\theta}$, control proceeds to block 76 and calculates a reliability metric. By way of non-limiting example, the reliability metric calculation module 40 can calculate the reliability metric as $$R_W = \frac{\sum_{k=\hat{\theta}}^{\hat{\theta}+N_g-1} r(k)r*(k+N)}{\sum_{k=\hat{\theta}}^{\hat{\theta}+N_g-1}\{|r(k)|^2+|r(k+N)|^2\}},$$

where $R_W$ is the reliability metric corresponding to the symbol timing estimation from the W samples included in the sampling window 62.

Control then proceeds to block 78 and determines a fractional carrier frequency offset (CFO) estimate. By way of non-limiting example, the CFO estimator module 42 can determine the fractional part of the CFO by using $$\hat{\varepsilon} = -\frac{1}{2\pi}\angle(\gamma(\hat{\theta})).$$

Control then proceeds to block 80 and terminates.

Figure 4:
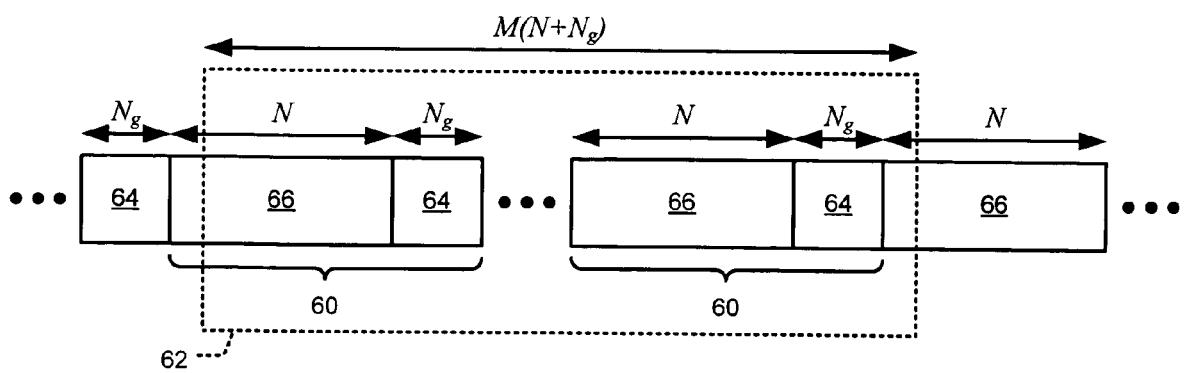
FIG. 4 is a timing diagram of an OFDM symbol stream and a sampling window of M OFDM symbols.
Figure 5:
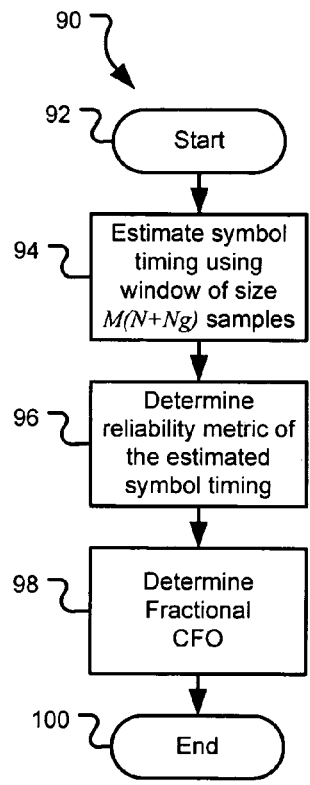
FIG. 5 is a flow chart illustrating steps of a method for estimating a symbol timing and a reliability metric from M OFDM symbols.

Referring now to FIGS. 4 and 5, a method 90 is shown for estimating the symbol timing and calculating the reliability metric from $M(N+N_g)$ samples, where M is a positive integer $\geq 2$. Using $M(N+N_g)$ samples can improve the reliability of the symbol timing estimate provided that the symbol timing, the fractional part of the CFO, and/or the fading properties of the wireless channel 14 are substantially constant over the $M(N+N_g)$ samples. When $M(N+N_g)$ samples are used, the sampling window 62 generally includes samples from M+/consecutive OFDM streaming symbol frames 60. Generally, the sampling from M+1 window 62 will overlap M+1 OFDM streaming symbol frames 60 that include M−1 entire streaming symbol frames 60 and parts of two other streaming symbol frames 60.

The method 90 begins in start block 92. Control then proceeds to block 94 and estimates the symbol timing of the streaming symbol frames 60 using a sampling window 62 of $M(N+N_g)$ samples. By way of non-limiting example, the symbol timing estimator module 38 can execute block 94 by solving an equation such as $$\hat{\theta} = \arg\max_{\theta}\{|\gamma(\theta)|\}, \text{ or}$$

$$\hat{\theta} = \arg\max_{\theta}\{|\gamma(\theta)| - \Phi(\theta)\}, \text{ where}$$

$$\gamma(\theta) \triangleq \sum_{m=0}^{M-2}\sum_{k=\theta+mN_t}^{\theta+mN_t+N_g-1} r(k)r*(k+N), \text{ and}$$

$$\Phi(\theta) \triangleq \frac{1}{2}\sum_{m=0}^{M-2}\sum_{k=\theta+mN_t}^{\theta+mN_t+N_g-1}\{|r(k)|^2+|r(k+N)|^2\}, \theta=0,\ldots,N_{t-1}.$$

Control then proceeds to block 96 and determines the reliability metric as $$R_W = \frac{\sum_{m=0}^{M-2} \sum_{k=\hat{\theta}+mN_t}^{\hat{\theta}+mN_t+N_g-1} r(k)r*(k+N)}{\sum_{m=0}^{M-2} \sum_{k=\hat{\theta}+mN_t}^{\hat{\theta}+mN_t+N_g-1} \{|r(k)|^2 + |r(k+N)|^2\}}.$$

Control then proceeds to block 98 and determines the CFO offset estimate as $$\hat{\varepsilon} = -\frac{1}{2\pi} \angle(\gamma(\hat{\theta})).$$

If the symbol timing, the CFO, and the conditions of the wireless channel 14 do not change substantially over the sampling window 62, then the reliability metric $R_W$ can be improved by successively increasing the size of the sampling window 62.

For the flat fading wireless channel 14, as M goes to infinity, $$R_W \rightarrow \frac{E_{k \text{ in Cyclic Prefix}}\{r(k)r*(k+N)\}}{E_{k \text{ in Cyclic Prefix}}\{|r(k)|^2 + |r(k+N)|^2\}} = \frac{\gamma\sigma_x^2}{\gamma\sigma_x^2 + \sigma_n^2} = \frac{SNR}{SNR+1},$$

where $$SNR = \frac{\gamma\sigma_x^2}{\sigma_n^2},$$

is the average signal-to-noise ratio (SNR) over the W samples, and $y=E[|h_k|^2]$ is the average energy of the flat fading wireless channel 14 over the W samples. It is assumed that $h_k$ does not change during the transmission of one of the parts 64, 66.

Note that, for the additive white Gaussian noise (AWGN) wireless channel 14, $\gamma=1$. Hence, $R_W$ can be compared to a predetermined reliability threshold in order to obtain an indication of the reliability of the estimates. If $R_W \geq$ reliability threshold, the synchronization is considered successful since the SNR of the wireless channel 14 is sufficiently high for the estimates of methods 70 and 90 to be reliable.

Figure 6:
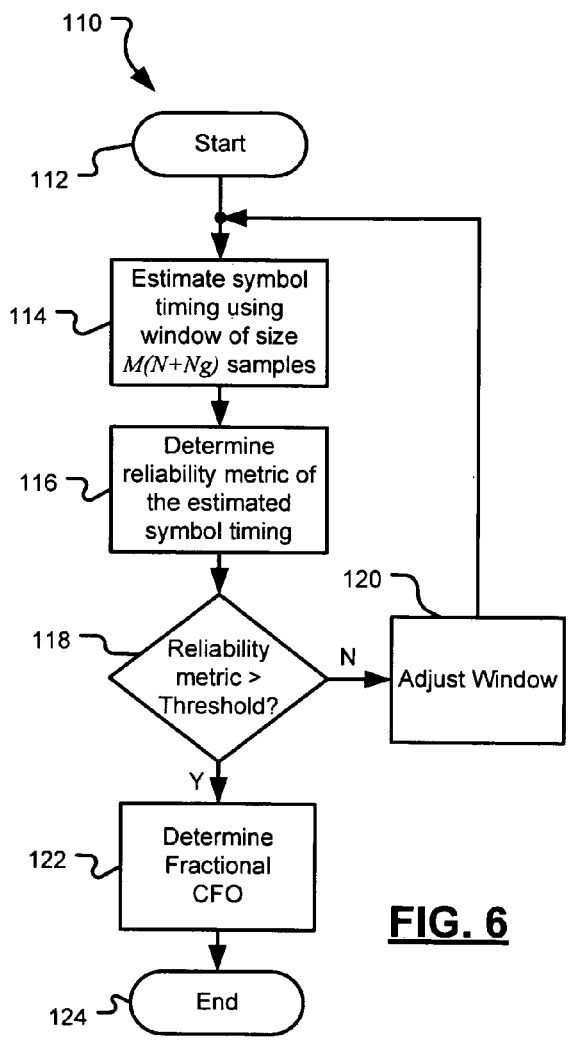
FIG. 6 is a flow chart illustrating steps of a method for determining properties of a sampling window.

Referring now to FIG. 6, a method 110 is shown for determining properties of the sampling window 62. The method 110 begins in start block 112. Control then proceeds to block 114 and uses a sampling window 62 of at least $(N+N_g)$ samples to estimate the symbol timing. Control then proceeds to block 116 and calculates the reliability metric $R_W$. Blocks 114 and 116 can be performed using the methods 70 and 90 and/or other methods.

Figure 7:
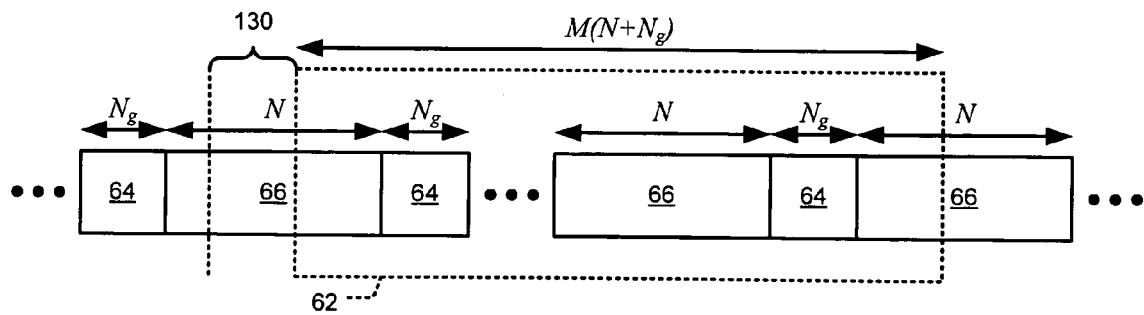
FIG. 7 is a timing diagram of an OFDM symbol stream and a shifted sampling window of M OFDM symbols.

Control then proceeds to decision block 118 and compares the reliability metric $R_W$ to the reliability threshold. If $R_W \leq$ reliability threshold, then control proceeds to block 120. In block 120, control adjusts the width and/or starting position of the sampling window 62. The width of the sampling window 62 can be adjusted by a predetermined amount or by a predetermined multiple of $(N+N_g)$. The position of the sampling window 62 can be adjusted by shifting the starting position of the sampling window 62 by a predetermined shift distance 130 (FIG. 7). In some embodiments, the predetermined shift distance 130 is equal to $N(N+N_g)$.

If the receiver 30 determines that a portion of the streaming symbol frames 60 is affected by a deep fade, it can skip the affected samples by moving the sampling window 62 further than the predetermined shift distance 130. By moving the sampling window 62 further than the predetermined shift distance 130, the method 110 can avoid stepping the sampling window 62 through the deep fade.

Control returns to block 114 after adjusting the length and/or position of the sampling window 62. Control continues to execute the loop of blocks 114, 116, 118, and 120 until the sampling window 62 is adjusted to a size and/or position that allows the reliability metric $R_W$ to exceed the reliability threshold in decision block 118. Once the reliability metric $R_W$ exceeds the reliability threshold, control proceeds from decision block 118 to block 122. In block 122, control determines the fractional CFO. Control then proceeds to block 124 and terminates.

As explained above, if the symbol timing, the fractional CFO, and the wireless channel 14 are constant, it would be possible to improve the reliability of the estimates, up to an upper bound corresponding to the channel SNR, by increasing the number of samples 64, 66 within the sampling window 62.

In many cases, however, the wireless channel 14 experiences fading. This means that the wireless channel 14, the symbol timing, and the CFO may be changing inside of the sampling window 62. Therefore, it may not be possible to use a large sampling window 62 for estimation.

As described above, the window size can be equal to $M(N+N_g)$. In general, an arbitrary window size can be used. In that case, expressions of the joint ML estimator for the additive white Gaussian noise (AWGN) wireless channel 14 can be found in J. Lee, H. Lou, and D. Toumpakaris, "*Maximum likelihood estimation of time and frequency offset for OFDM systems*," Electronics Letters, vol. 40, no. 22, pp. 1428-1429, October 2004, which is hereby incorporated by reference in its entirety. Since "*Maximum likelihood estimation of time and frequency offset for OFDM systems*" assumes knowledge of the SNR at the receiver, slightly modified expressions can be used that are similar to what was shown above for the sampling window 62 size of $M(N+N_g)$ samples.

A larger sampling window 62 size results in more reliable estimates as long as the wireless channel 14 does not change considerably inside the sampling window 62. However, by employing a smaller sampling window 62 size, synchronization may be achieved quickly and with less computational burden if the channel is good, at the expense of less reliable estimates.

Finally, note that the symbol timing estimate is obtained before evaluating the reliability metric $R_W$. The expressions for each symbol timing candidate involve addition and multiplication operations that are straightforward from a computational aspect. After the symbol timing estimate is found, the reliability metric $R_W$, is determined only once. Since the reliability metric $R_W$ is computationally more complex than the symbol timing estimate, this order of operations reduces computational complexity without penalizing the reliability of the estimates.

The method 110 is one way of adapting the estimation process to the channel changes. Other methods may also be used to decide whether the sampling window 62 should be moved and/or resized. The other methods can include other metrics and/or information. In some cases information, such as SNR, of the channel 14 may be available and indicate that some of the samples 64, 66 have a higher quality than other samples 64, 66 in the sampling window 62. In such a situation, the symbol timing estimator module 38 can assign greater weighting factors to the samples 64, 66 having the higher quality and lower weighting factors to the samples 64, 66 with the lower quality. Magnitudes of the weighting factors can be a function of the corresponding quality of each of the samples 64, 66. Such a method may synchronize faster than increasing the size of the sampling window 62 to compensate for the samples 64, 66 with the lower quality.

Figure 8:
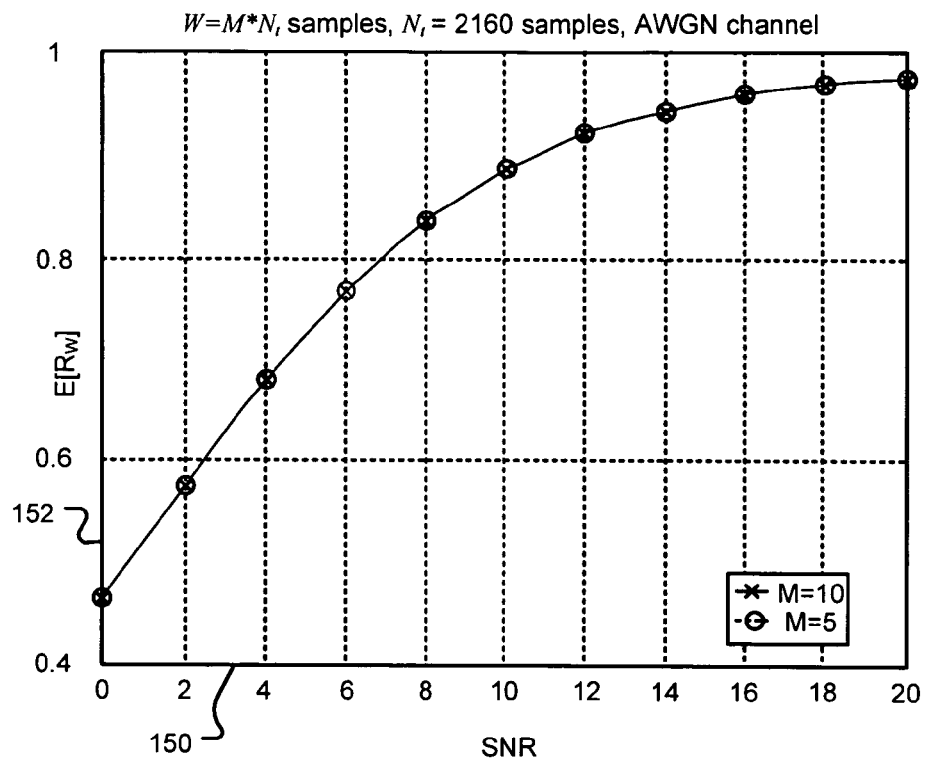
FIG. 8 is a plot of simulation results of a mean reliability metric of symbol timing estimates.

Referring now to FIG. 8, simulation results are shown of a mean reliability metric of symbol timing estimates. The estimates were determined through the AWGN wireless channel 14 for two sizes of sampling windows 62. The simulation was executed with N=2048, $N_g$=112, $N_t$=2160 samples, W=M*$N_t$ samples. A horizontal axis 150 represents increasing SNR and a vertical axis 152 represents an increasing mean reliability metric. The simulation results show that as the SNR increases, $R_W$ approaches 1, since the power of the noise decreases. Also, note that $R_W$ does not depend considerably on the size of the window W=$MN_t$. This is because for M=5, the (M−1)$N_g$ terms that are used to compute the numerator of $R_W$ are enough for the correlation to converge. However, the size of W affects the quality of the timing and frequency offset estimates.

Figure 9:
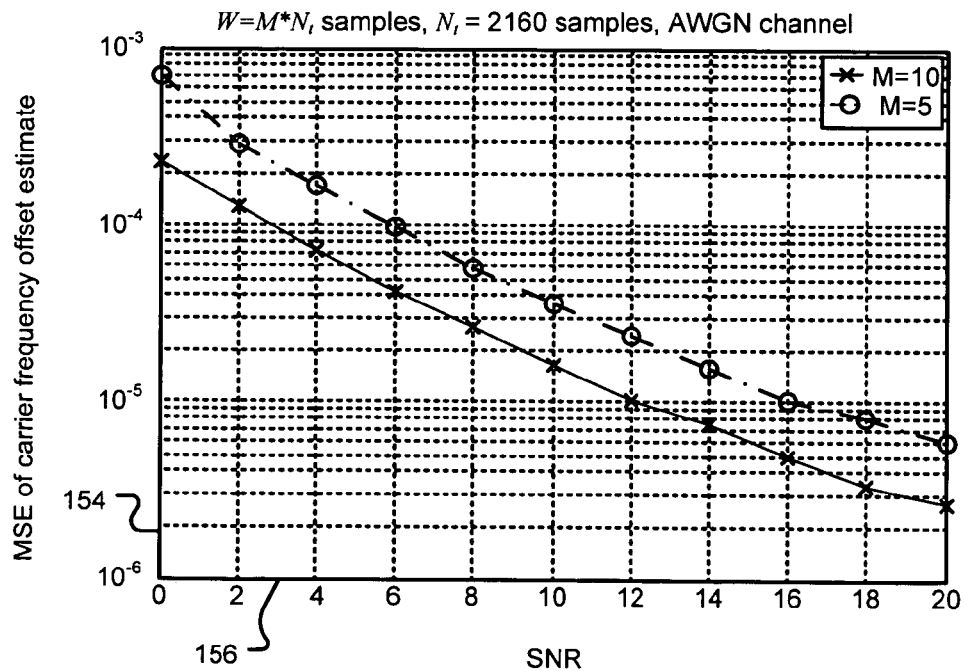
FIG. 9 is a plot of simulation results of a mean square error of carrier frequency offset estimates.

Referring now to FIG. 9, simulation results are shown of mean square errors of CFOs determined through the AWGN wireless channel 14. A vertical axis 154 represents increasing mean square error of the estimate of the fractional carrier frequency offset. A horizontal axis 156 represents increasing SNR for the AWGN wireless channel 14. The simulation was executed once with M=10 and again with M=5. The simulation results show that using a larger sampling window 62, e.g. larger M, results in better estimates of the fractional CFO. Hence, in order to improve the estimation, either M can be increased and/or the system 10 can operate at a higher SNR.

Figure 10:
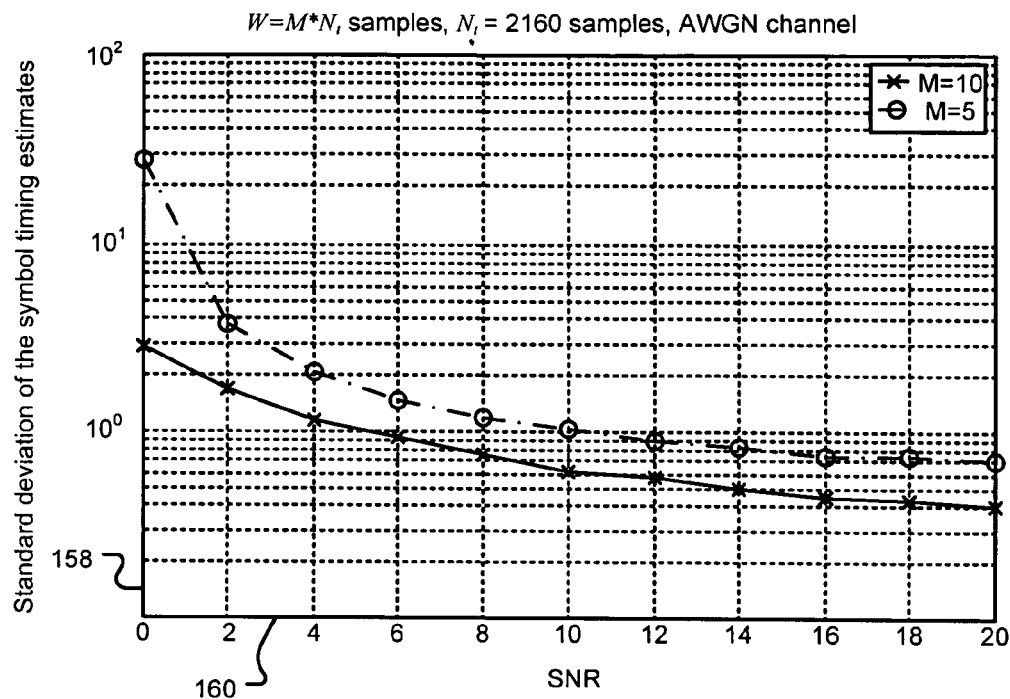
FIG. 10 is a plot of simulation results of standard deviations of symbol timing estimates.

Referring now to FIG. 10, simulation results are shown of standard deviations of the symbol timing estimates determined through the AWGN wireless channel 14. A vertical axis 158 represents increasing standard deviations of the symbol timing estimates. A horizontal axis 160 represents increasing SNR for the AWGN wireless channel 14. The simulation was executed once with M=10 and again with M=5. The simulation results show that using a larger sampling window 62, e.g. larger M, results in better estimates of the symbol timing. Hence, in order to improve the estimation, either M can be increased and/or the system 10 can operate at a higher SNR.

For the AWGN wireless channel 14 or slow fading, and assuming that computational complexity is not a restricting factor, it may be desirable to increase M. On the other hand, for the fast fading wireless channel 14 it may be better to use a relatively small size sampling window 62 and wait for a "good" channel (corresponding to high SNR), albeit at the cost of increased synchronization delay.

Figure 11:
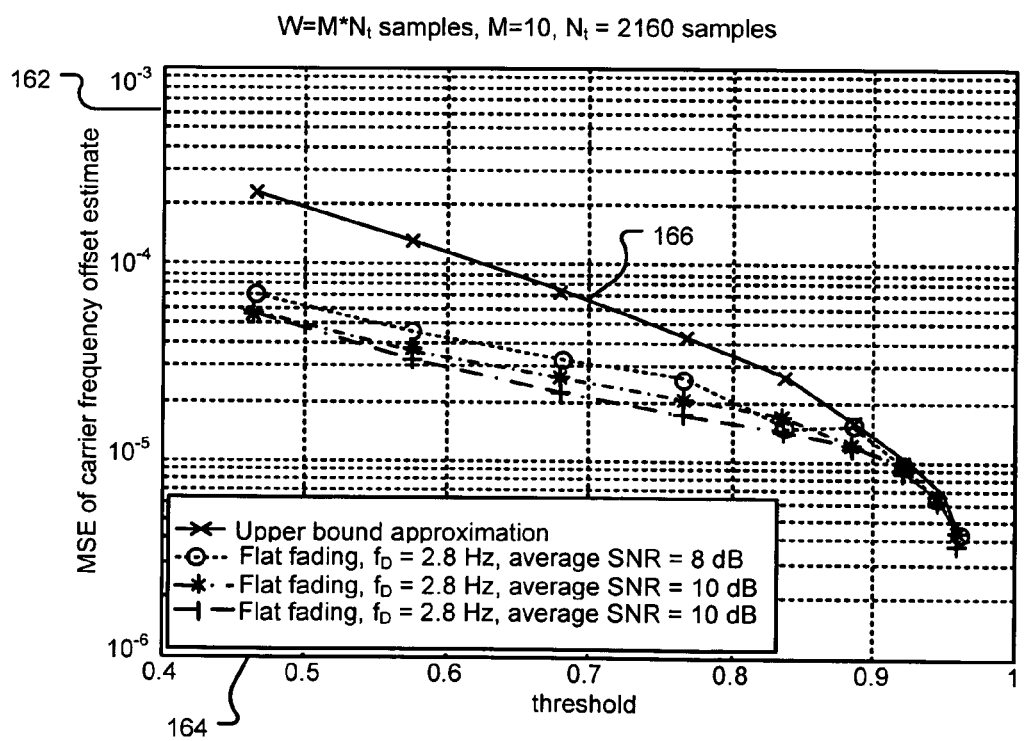
FIG. 11 is a plot of simulation results of mean square errors of estimated fractional carrier frequency offsets for different reliability threshold values.

Referring now to FIG. 11, simulation results are shown of mean square errors (MSE) of estimated CFOs as a function of the reliability metric Rw. The system 10 is transmitting through a 1-tap Rayleigh fading (flat fading) wireless channel 14. A Doppler frequency=2.8 Hz. Similar to all previous examples, N=2048, $N_g$=112, $N_1$=2160. M is equal to 10. A vertical axis 162 represents increasing MSEs of estimated CFOs. A horizontal axis 164 represents increasing values of the reliability threshold.

As can be seen from the simulation results, use of a particular reliability threshold value guarantees that the MSE of the fractional carrier frequency offset remains below an approximated upper bound 166, regardless of the average SNR of the wireless channel 14. The approximated upper bound 166 is the same as the AWGN plot of FIG. 9 for M=10, the difference being that it is plotted as a function of E[$R_W$] corresponding to a particular SNR (see FIG. 7). In practice, the upper bound 166 can be obtained using simulations, since it depends on the wireless channel 14 characteristics.

As can also be seen from the simulation results, the estimation error decreases as the reliability threshold is increased. The behavior of the MSE does not depend significantly on the average SNR of the wireless channel 14. The slight variations occur because, when the reliability threshold is exceeded, a wireless channel 14 with a high average SNR will tend to also have a high instantaneous SNR when compared to a wireless channel 14 with a low average SNR. For the flat fading wireless channel 14 the mean square error of the estimate of the fractional carrier frequency offset is bounded by the approximation curve. While this may not be true for all channels, the curve may be used as an indication for the resulting values of the mean square error when using the proposed method.

Although the resulting mean square error after estimation will be regulated by the reliability threshold, it should be noted that more sampling window 62 shifts will be needed, on average, for the wireless channel 14 with lower average SNR before synchronization can be achieved. This is because, on average, at lower SNRs more time is needed to find a good part of the wireless channel 14 where $R_W$ exceeds the reliability threshold.

Figure 12:
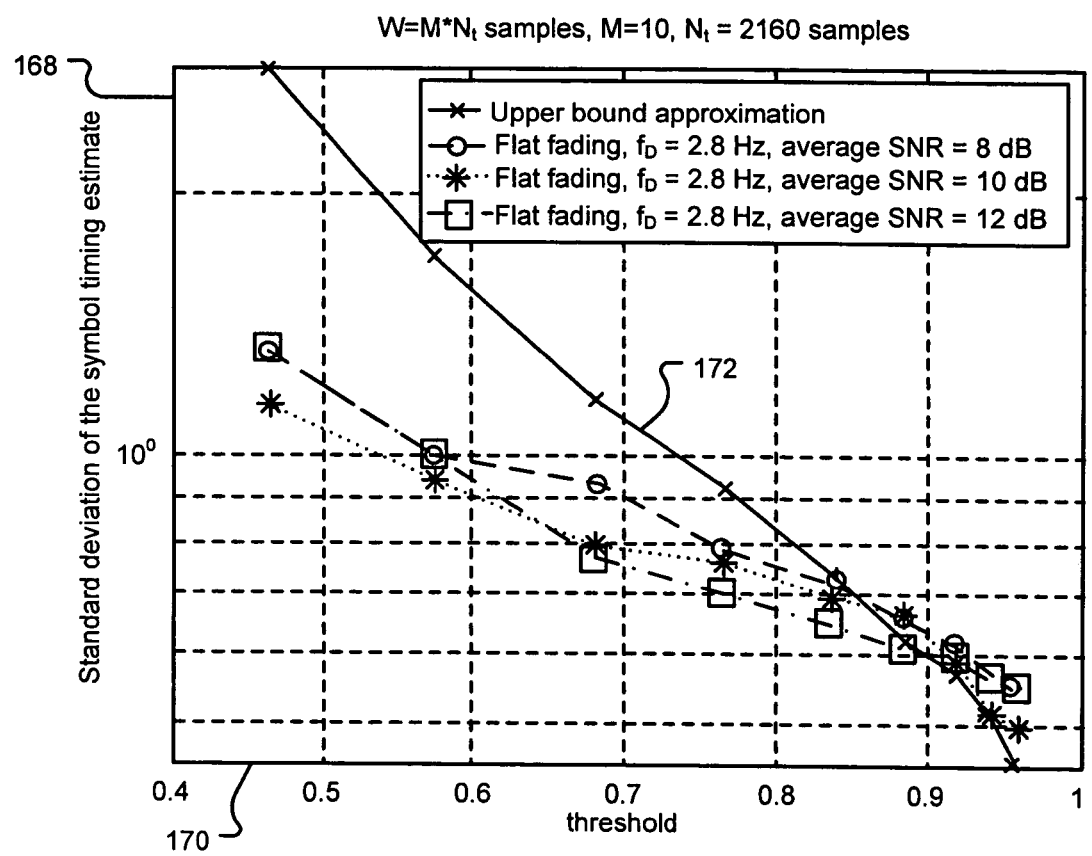
FIG. 12 is a plot of simulation results of standard deviations of estimated symbol timings for different reliability threshold values.

Referring now to FIG. 12, simulation results are shown of a variation of the standard deviation of the error of the symbol timing estimate as a function of the reliability threshold. A vertical axis 168 represents increasing standard deviations of the estimated symbol timings. A horizontal axis 170 represents increasing values of the reliability threshold. Similar to the CFO, the estimation of the symbol timing improves as the reliability threshold is increased. Again, an upper bound approximation curve 172 provides a good indication of the standard deviation that can be expected. Accurate results for each channel model can be obtained by simulation.

A number of implementations of the invention have been described. Nevertheless, it will be understood that various modifications may be made without departing from the spirit and scope of the invention. Accordingly, other implementations are within the scope of the following claims.

What is claimed is:

1. An Orthogonal Frequency Division Multiplexing (OFDM) synchronization module comprising:
   a window generator module that generates a sampling window that bounds a plurality of samples of OFDM symbols;
   a symbol timing estimator module that generates an estimated symbol timing from the plurality of samples before a fast Fourier transform operation is performed on the plurality of samples; and
   a reliability metric calculator that calculates a reliability metric for the estimated symbol timing based on the estimated symbol timing, wherein the window generator module changes at least one parameter of the sampling window based on the reliability metric.

2. The OFDM synchronization module of claim 1 wherein the samples include cyclic prefix samples.

3. The OFDM synchronization module of claim 1 wherein the samples include data samples.

4. The OFDM synchronization module of claim 1 wherein the window generator module changes the at least one parameter of the sampling window based on the reliability metric and a reliability threshold.

5. The OFDM synchronization module of claim 4 wherein the window generator module changes the at least one parameter of the sampling window until the reliability metric exceeds the reliability threshold.

6. The OFDM synchronization module of claim 1 wherein the at least one parameter includes a first width of the sampling window.

7. The OFDM synchronization module of claim 6 wherein the first width of the sampling window is an integer multiple of a second width of the plurality of samples.

8. The OFDM synchronization module of claim 1 wherein the at least one parameter includes a starting position of the sampling window.

9. The OFDM synchronization module of claim 8 wherein the window generator module changes the starting position of the sampling window by a predetermined distance.

10. The OFDM synchronization module of claim 9 wherein the window generator module moves the starting position of the sampling window further than the predetermined distance when at least one of the samples is affected by channel fading and skips the at least one of the samples affected by the channel fading.

11. The OFDM synchronization module of claim 1 further comprising a fractional carrier frequency offset determination module that determines a fractional carrier frequency offset when the reliability metric exceeds a reliability threshold.

12. The OFDM synchronization module of claim 1 wherein the symbol timing estimator module applies corresponding weighting factors to groups of the plurality of samples.

13. The OFDM synchronization module of claim 12 wherein each corresponding weighting factor is based on a quality of the corresponding group of samples.

14. The OFDM synchronization module of claim 12 wherein each corresponding weighting factor is based on a signal-to-noise (SNR) ratio of the corresponding group of samples.

15. A receiver comprising the OFDM synchronization module of claim 1.

16. The receiver of claim 15 wherein the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

17. The receiver of claim 15 further comprising:
an RF demodulator that receives streaming symbol frames and generates the stream of OFDM symbol samples based on the streaming symbol frames;
a cyclic prefix removal module that communicates with the RF demodulator and that removes cyclic prefix samples from the plurality of samples;
a serial-to-parallel (S2P) module that communicates with the cyclic prefix removal module and that generates time-domain parallel signals based on data samples in the stream of samples;
a fast-Fourier transform module that receives the time-domain parallel signals and converts the time-domain parallel signals to corresponding parallel signal streams; and
a signal mapping module that receives the parallel signal streams and maps the parallel signal streams to a parallel-to serial (P2S) module, wherein the P2S module generates digital data packets based on the parallel signal streams.

18. The OFDM synchronization module of claim 1 wherein the symbol timing estimator module generates the estimated symbol timing based on at least one of autocorrelation and energy values of the samples.

19. The OFDM synchronization module of claim 1 wherein the window generator module provides timing for the symbol timing estimator module to generate the estimated symbol timing from the plurality of samples in the sampling window.

20. The OFDM synchronization module of claim 1 wherein the window generator module outputs the plurality of samples in the sampling window to the symbol timing estimator module.

21. The OFDM synchronization module of claim 1 wherein a value of the reliability metric is proportional to a size of the sampling window.

22. The OFDM synchronization module of claim 1 wherein a value of the reliability metric is proportional to a number of the plurality of samples in the sampling window.

23. The OFDM synchronization module of claim 1 wherein the reliability metric measures reliability of the symbol timing estimate, and wherein the reliability of the symbol timing estimate is proportional to a value of the reliability metric.

24. The OFDM synchronization module of claim 1 wherein a value of the reliability metric is less than or equal to 1.

25. The OFDM synchronization module of claim 1 wherein the reliability metric calculator calculates the reliability metric based on a ratio of signal-to-noise ratio (SNR) to (SNR+1) for a fast fading channel.

26. The OFDM synchronization module of claim 1 wherein the reliability metric calculator calculates the reliability metric based on a ratio of a signal power estimate to an estimate of a sum of signal power and noise power, wherein the signal power estimate and the estimate of the sum are generated based on the estimated symbol timing.

27. The OFDM synchronization module of claim 1 wherein:
the symbol timing estimator module generates the estimated symbol timing based on a first signal power estimate generated based on the plurality of samples; and
the reliability metric calculator calculates the reliability metric based on a ratio of a second signal power estimate to an estimate of a sum of signal power and noise power, wherein the second signal power estimate and the estimate of the sum are generated based on the estimated symbol timing.

28. The OFDM synchronization module of claim 1 wherein:
the symbol timing estimator module generates the estimated symbol timing based on a first signal power estimate and a first estimate of a sum of signal power and noise power, wherein the first signal power estimate and the first estimate of the sum are generated based on the plurality of samples; and
the reliability metric calculator calculates the reliability metric based on a ratio of a second signal power to a second estimate of a sum of signal power and noise power, wherein the second signal power estimate and the second estimate of the sum are generated based on the estimated symbol timing.

29. A method comprising:
generating a sampling window that bounds a plurality of samples of Orthogonal Frequency Division Multiplexing (OFDM) symbols;

generating an estimated symbol timing using a symbol timing estimator module from the plurality of samples before a fast Fourier transform operation is performed on the plurality of samples;

calculating a reliability metric for the estimated symbol timing based on the estimated symbol timing; and changing at least one parameter of the sampling window based on the reliability metric.

30. The method of claim 29 wherein the samples include cyclic prefix samples.

31. The method of claim 29 wherein the samples include data samples.

32. The method of claim 29 further including changing the at least one parameter of the sampling window based on the reliability metric and a reliability threshold.

33. The method of claim 32 further comprising changing the at least one parameter of the sampling window until the reliability metric exceeds the reliability threshold.

34. The method of claim 29 wherein the at least one parameter includes a first width of the sampling window.

35. The method of claim 34 wherein the first width of the sampling window is an integer multiple of a second width of the plurality of samples.

36. The method of claim 29 wherein the at least one parameter includes a starting position of the sampling window.

37. The method of claim 29 further comprising determining a fractional carrier frequency offset when the reliability metric exceeds a reliability threshold.

38. The method of claim 29 further comprising applying a corresponding weighting factors to groups of the plurality of samples.

39. The method of claim 38 wherein each corresponding weighting factor is based on a quality of the corresponding group of samples.

40. The method of claim 38 wherein each corresponding weighting factor is based on a signal-to-noise (SNR) ratio of the corresponding group of samples.

41. The method of claim 29 wherein the method is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

42. The method of claim 29 further comprising:
receiving streaming symbol frames;
generating the stream of OFDM symbol samples based on the streaming symbol frames;
removing cyclic prefix samples from the symbol samples;
generating time-domain parallel signals based on data samples in the stream of samples;
converting the time-domain parallel signals to corresponding parallel signal streams; and
generating digital data packets based on the parallel signal streams.

43. An Orthogonal Frequency Division Multiplexing (OFDM) synchronization module comprising:
window generating means for generating a sampling window that bounds a plurality of samples of OFDM symbols;
symbol timing estimating means for generating an estimated symbol timing from the plurality of samples before a fast Fourier transform operation is performed on the plurality of samples; and
reliability metric calculating means for calculating a reliability metric for the estimated symbol timing based on the estimated symbol timing, wherein the window generating means changes at least one parameter of the sampling window based on the reliability metric.

44. The OFDM synchronization module of claim 43 wherein the samples include cyclic prefix samples.

45. The OFDM synchronization module of claim 43 wherein the samples include data samples.

46. The OFDM synchronization module of claim 43 wherein the window generating means changes the at least one parameter of the sampling window based on the reliability metric and a reliability threshold.

47. The OFDM synchronization module of claim 46 wherein the window generating means changes the at least one parameter of the sampling window until the reliability metric exceeds the reliability threshold.

48. The OFDM synchronization module of claim 43 wherein the at least one parameter includes a first width of the sampling window.

49. The OFDM synchronization module of claim 48 wherein the first width of the sampling window is an integer multiple of a second width of the plurality of samples.

50. The OFDM synchronization module of claim 43 wherein the at least one parameter includes a starting position of the sampling window.

51. The OFDM synchronization module of claim 43 further comprising fractional carrier frequency offset determining means for determining a fractional carrier frequency offset when the reliability metric exceeds a reliability threshold.

52. The OFDM synchronization module of claim 43 wherein the symbol timing estimating means applies corresponding weighting factors to groups of the plurality of samples.

53. The OFDM synchronization module of claim 52 wherein each corresponding weighting factor is based on a quality of the corresponding group of samples.

54. The OFDM synchronization module of claim 52 wherein each corresponding weighting factor is based on a signal-to-noise (SNR) ratio of the corresponding group of samples.

55. A receiver comprising the OFDM synchronization module of claim 43.

56. The receiver of claim 55 wherein the receiver is compliant with at least one of Institute of Electrical and Electronics Engineers (IEEE) 802.11a, 802.11g, and 802.11n, European Technical Standards Institute (ETSI) DVB-H, ETSI DVB-T, ETSI EN 300 401 V1.3.3, ETSI ES 201 980 V2.1.1, and National Radio Standards Committee (NRSC)-5.

57. The receiver of claim 55 further comprising:
RF demodulating means for receiving streaming symbol frames and generating the stream of OFDM symbol samples based on the streaming symbol frames;
cyclic prefix removal means for communicating with the RF demodulator and removing cyclic prefix samples from the plurality of samples;
serial-to-parallel (S2P) means for communicating with the cyclic prefix removal means and generating time-domain parallel signals based on data samples in the stream of samples;
fast-Fourier means for receiving the time-domain parallel signals and converting the time-domain parallel signals to corresponding parallel signal streams; and
signal mapping means for receiving the parallel signal streams and mapping the parallel signal streams to parallel-to serial (P2S) means for generating digital data packets based on the parallel signal streams.

* * * * *